United States Patent [19]

Kiguchi

[11] Patent Number: 5,507,555
[45] Date of Patent: Apr. 16, 1996

[54] SHOCK ENERGY ABSORBING MECHANISM IN TILT LOCK DEVICE

[75] Inventor: Shigeru Kiguchi, Yokohama, Japan

[73] Assignee: Koito Industries, Limited, Kanagawa, Japan

[21] Appl. No.: 284,550

[22] PCT Filed: Aug. 2, 1993

[86] PCT No.: PCT/JP93/01079

§ 371 Date: Dec. 29, 1994

§ 102(e) Date: Dec. 29, 1994

[87] PCT Pub. No.: WO94/18871

PCT Pub. Date: Sep. 1, 1994

[30] Foreign Application Priority Data

Feb. 24, 1993 [JP] Japan .................... 5-59681

[51] Int. Cl.$^6$ ............... B60N 2/42; B60R 21/00
[52] U.S. Cl. ............... 297/216.14; 297/216.1; 297/216.13; 297/378.12; 297/452.18
[58] Field of Search .......... 297/216.13, 216.14, 297/216.1, 452.18, 378.11, 378.12

[56] References Cited

U.S. PATENT DOCUMENTS

| | | | |
|---|---|---|---|
| 3,354,990 | 11/1967 | Stahl | 297/216.1 X |
| 3,437,367 | 4/1969 | Blank | 297/216.1 X |
| 4,243,264 | 1/1981 | Bell | 297/378.12 X |
| 4,761,036 | 8/1988 | Vogel | 297/452.18 |
| 5,246,271 | 9/1993 | Boisset | 297/378.12 X |
| 5,265,937 | 11/1993 | Allen | 297/378.11 |
| 5,290,089 | 3/1994 | Oleszko et al. | 297/216.1 X |
| 5,318,341 | 6/1994 | Griswold et al. | 297/452.18 X |
| 5,366,268 | 11/1994 | Miller et al. | 297/216.3 X |

FOREIGN PATENT DOCUMENTS 1630891 11/1978 Germany .................... 297/216.13

*Primary Examiner*—José V. Chen
*Assistant Examiner*—Rodney B. White
*Attorney, Agent, or Firm*—Sughrue, Mion, Zinn, Macpeak & Seas

[57] ABSTRACT

Disclosed is a tilt lock device for a passenger seat used for a vehicle, ship or air plane, which has a seat back (1) mounting a shoulder harness (12). It includes a base frame (5) having a pair of right and left spreaders (6) composed of front side supporting portions (6a) hung substantially in the horizontal direction between front and rear beams (3)(4), and rear side supporting portions (6b) projecting so as to be tilted upward from the rear portions of the front side supporting portions (6a), wherein the lower end portions of seat back frames (2) are rotatably supported on the rear side supporting portions (6b) of the spreaders (6). In the base frame (5), a bearing portion (2b) is formed on the base frame (5) side upward from a seat back frame (2) rotatably supporting portion with respect to the rear side supporting portion (6b) of each of the spreaders (6); an arm (13) is fixed at a rear end of the front side supporting portion (6a) of the spreader (6); a guide hole (14) is perforated on the upper portion of the arm (13) in such a manner as to face to the bearing portion (2b) formed on the seat back frame (2); and a damping structure (16) is formed within the guide hole (14) and a lower end portion (15b) of a lock/lever (15) having an upper end side (15a) turnably fixed on the bearing portion (2b) of the seat back frame (2) is inserted in the guide hole (14) through the damping structure (16).

11 Claims, 6 Drawing Sheets

(a)    (b)

1

SHOCK ENERGY ABSORBING MECHANISM IN TILT LOCK DEVICE

TECHNICAL FIELD

The present invention relates to a tilt lock device for a passenger seat having a seat back mounting a shoulder harness which is applicable for a vehicle, ship or airplane, and particularly to a shock energy absorbing mechanism in a tilt lock device capable of damping and absorbing a shock load applied to a seat back.

BACKGROUND ART

Conventionally, in a passenger seat for a vehicle, ship or air plane, a reclining device has been provided in order to allow a passenger to suitably tilt a seat back rearward, and a seat belt has been mounted to protect passenger from shock applied to the seat. In general, in the reclining device of this type, seat back frames are rotatably fixed on rear side supporting portions of spreaders forming a base frame, and seat lock devices are linked with the lower end portions of the seat back frames, so that the seat back frames are movable back and forth by extension/contraction of the seat lock devices. In particular, the so-called shoulder harness (hanging type seat belt) is mounted on a passenger seat disposed on the front row for enhancing the safety of a passenger. In the passenger seat mounting tile shoulder harness of this type, a load applied to a passenger upon generation of the shock is supported by the seat back itself through the shoulder harness.

Further, the above seat lock devices constituting the reclining device of the seat can support a large load in tile compression direction, that is, in the direction of turning and tilting the seat back rearwardly; however, can only a small load in the extension direction, that is, in the direction of raising and turning the seat back forward. In particular, in a seat forming brake over arms, the seat back is folded forward in such a state that the seat back frames are fixed by the seat lock devices only by applying of a small load such as 310 bs to the seat back, and thus a large load in the forward direction cannot be supported. In the case that the shoulder harness is mounted on the seat back having such a structure, since the seat back itself cannot support a forward load, the seat back is simply tilted or folded forward by a forward load applied from the shoulder harness to the seat back, which brings about a problem in losing the significance of the mounting of the shoulder harness on the seat back.

Taking the above circumstances into consideration, the present invention has been made, and its object is to provide a shock energy absorbing mechanism in a tilt lock device used for a seat back of a seat, which prevents the forward turning of a seat back by interposing lock levers on shaft supporting portions of seat back frames formed on spreaders for receiving a load applied to the seat back through a shoulder harness; and damps a shock energy transmitted from the seat back to the other member of the seat by the leading edge of the lock levers for absorbing the shock energy without changing the strength or the material of the other portions of the seat.

SUMMARY OF THE INVENTION

To achieve the above object, according to the present invention, there is provided a shock energy absorbing mechanism in a tilt lock device, which includes a base frame having a pair of right and left spreaders composed of front side supporting portions hung substantially in the horizontal direction between front and rear beams, and rear side supporting portions projecting so as to be tilted upward from the rear portions of the front side supporting portions, wherein the lower end portions of seat back frames are rotatably supported on the rear side supporting portions of the spreaders. In the above base frame, a bearing portion is formed on the base frame side upward from a seat back frame rotatably supporting portion with respect to the rear side supporting portion of each of the spreaders; an arm is fixed at a rear end of the front side supporting portion of the spreader; a guide hole is perforated on the upper portion of the arm in such a manner as to face to the bearing portion formed on the seat back frame; and a lower end portion of a lock lever having an upper end side turnably fixed oil the bearing portion of the seat back frame is inserted in the guide hole. Thus, the lower end portion of the lock lever is axially slid within the guide hole of the supporting arm according to the reclining action of the seat back frame.

The above damping structure is composed of the arm in which a deforming guide surface is formed around the inner surface of the guide hole, and the lock lever formed with a deforming cylinder portion which is deformed and buckled along the deforming guide surface when being fitted in the guide hole of the arm. Further, it comprises a shock absorbing member interposed between the interior of the guide hole and the leading edge of the lower end portion of the lock lever fitted in the guide hole. With this construction, in the case that the seat back is operated in the reclining direction, that is, in tile contracting direction of the seat lock, the lower end portion of the lock lever is freely slid in the direction of being moved out of the guide hole of the supporting arm, and further, when the seat back is applied with a forward load, the lower end portion of the lock lever is fitted in the guide hole, and is abutted at its leading edge on the bottom portion of the guide hole to support the load, thus preventing the forward tilting of the seat back.

Further, when a shock load more than a specified value is applied, the lower end portion of the lock lever fitted within the guide hole is further pushed toward the bottom portion, and is abutted on the bottom portion of the guide hole while the leading edge thereof deforms and buckles the damping structure, to support the load, thus damping and absorbing the shock load due to the extinction of the mechanical energy accompanied with the deformation and buckling of the damping structure.

BRIEF DESCRIPTION OF THE DRAWINGS

FIGS. 6a and 6b show a first embodiment of a damping structure according to tile present invention; wherein FIG. 6a is an enlarged vertical sectional view of essential parts showing a fitting state of a lock lever into a guide hole in the normal usage of a seat; and FIG. 6b is an enlarged vertical sectional view of essential parts showing a fitting state of a lock lever into a guide hole after generation of a shock load;

FIGS. 7a and 7b are related to a second embodiment of a damping structure according to the present invention, and which are perspective views showing a shock absorbing member interposed at the leading edge of the lower end of a lock lever; wherein FIG. 7a shows the state before generation of a shock load, and FIG. 7b shows the state after generation of a shock load;

FIGS. 8a and 8b are related to a third embodiment of a damping structure according to the present invention, and which are perspective views showing a shock absorbing member interposed at the leading edge of the lower end portion of a lock lever, wherein FIG. 8a shows the state before generation of a shock load; and FIG. 8b shows the state after generation of a shock load;

DESCRIPTION OF THE PREFERRED EMBODIMENTS

Figure 1:
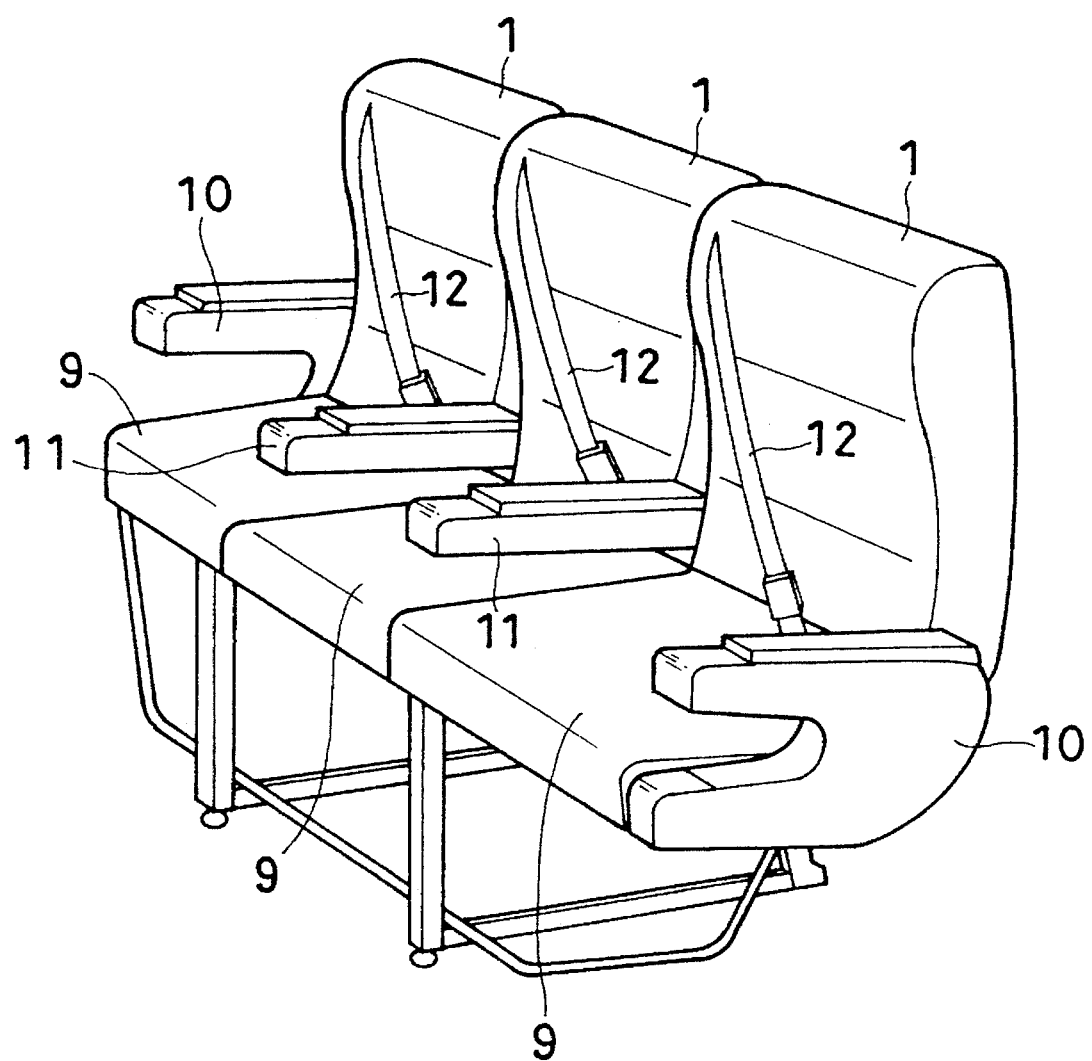
FIG. 1 is a perspective view of a passenger seat mounting a shoulder harness according to the present invention.
Figure 2:
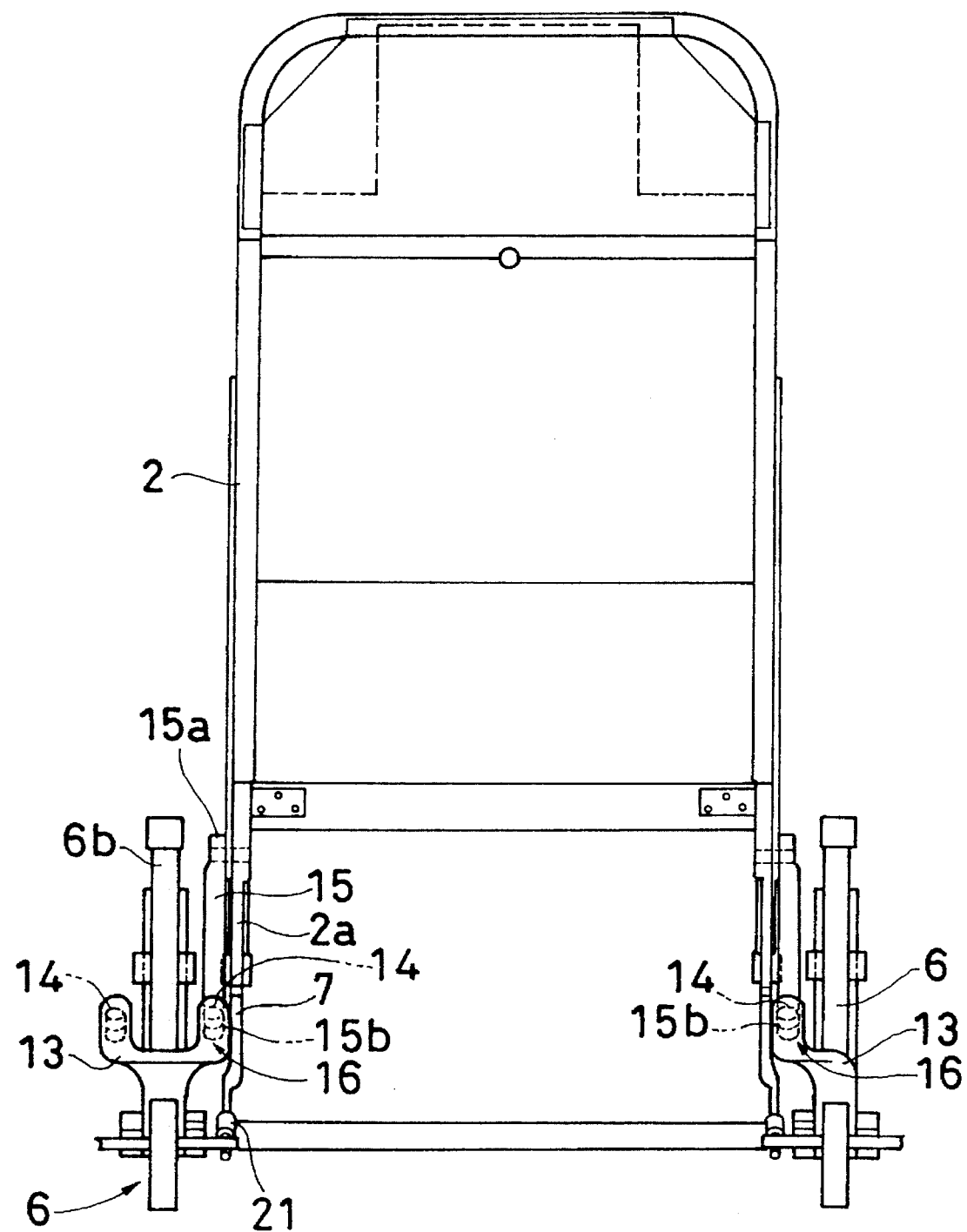
FIG. 2 is a front view showing seat back frames erected on a base frame.

Hereinafter, preferred embodiments of shock energy absorbing mechanisms in tilt lock devices according to the present invention will be described with reference to the drawings.

In the drawings, numeral 1 indicates a seat back of a seat; and 2 are seat back frames for supporting and fixing the seat back 1 on the rear portion of the seat while holding the right and left sides of the seat back 1. Lower end portions 2a of the seat back frames 2 are rotatably fixed in the longitudinal direction on rear side supporting portions 6b of a pair of right and left spreaders 6 fixed in a hanging manner between front and rear beams 3 and 4 for forming a base frame 5. In the example shown in the figure each of the lower end portions 2a is formed with a brake over arm 7 for folding the seat back 1 forward when the seat is contained, and is rotatably supported by a common shaft 8 together with the brake over arm 7. Numeral 9 indicates a seat bottom mounted on the base frame 5, and wings 10 are formed on both the sides of the seat bottom 9. Additionally, in the case that a plurality of seats are formed, each intermediate armchair 11 is mounted so as to be positioned between the adjacent seats and to be rotatable in the vertical direction. Further, numeral 12 indicates a shoulder harness, wherein the upper end side belt thereof is fixed on the one side upper end portion of the seat back frame 2 through a metal fixture (not shown) and the lower end side belt thereof is fixed on the other side surface of the base frame 5.

Figure 3:
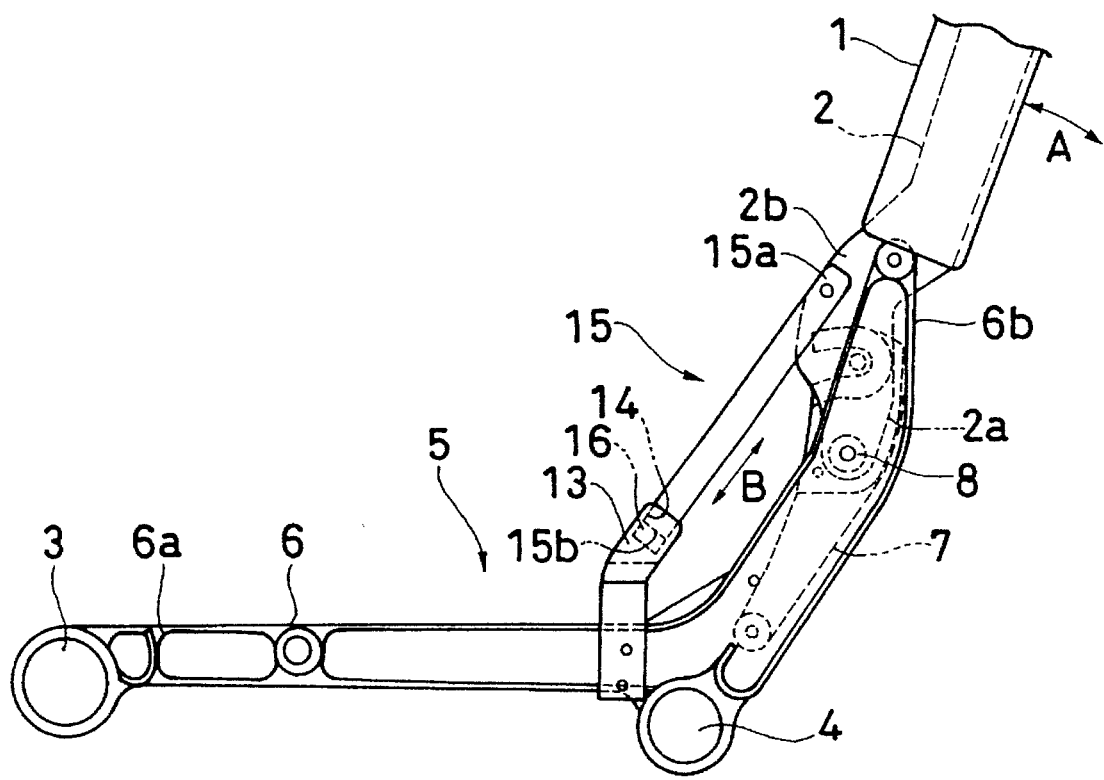
FIG. 3 is a side view of a spreader portion showing a tilt lock device according to the present invention.
Figure 4:
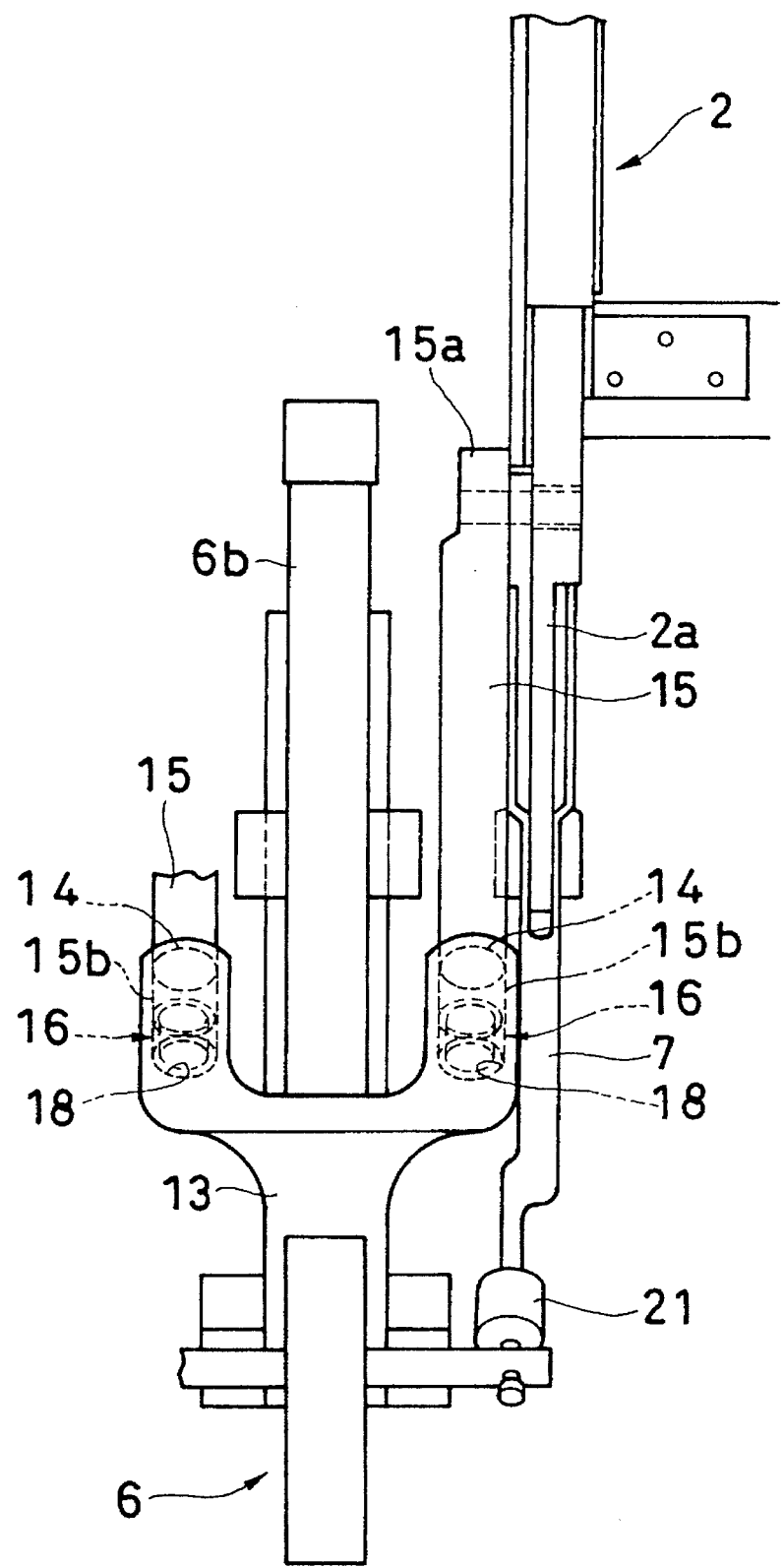
FIG. 4 is an enlarged front view of essential parts showing the structure of an arm formed between seats.
Figure 5:
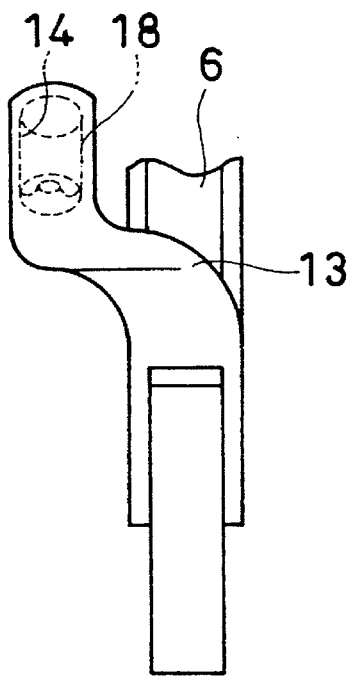
FIG. 5 is an enlarged front view of essential parts showing the structure of the arm formed on the side portion of a seat.

On the lower end portion 2a of the seat back frame 2, there is formed a bearing portion 2b projecting forward from the base frame 5 substantially in a dogleg shape as seen from the side surface so as to be located upward from the common shaft 8 of the seat back frame 2 with respect to the rear side supporting portion 6b of the spreader 6. Further, on the rear end side of each front side supporting portion 6a of the spreaders 6 hung substantially in the horizontal direction between the front and rear beams 3 and 4 of the base frame 5, an arm 13 is fixed. A guide hole 14 facing the bearing portion 2b formed in the seat back frame 2 is perforated on the upper portion of the arm 13. A lower end portion 15b of a lock lever 15 having the upper end side 15a rotatably fixed on the bearing portion 2b of the seat back frame 2 is inserted in the guide hole 14. When the seat back frame 2 is moved back and forth (in the direction of the arrow A of FIG. 3), the lower end portion 15b of the lock lever 15 is slid in the axial direction (in the direction of the arrow B) within the guide hole 14 of the arm 13. Further, in the case of being mounted between a plurality of seats, a pair of the right and left arms are formed to correspond to the seat back frames 2 disposed on both the sides of the seat (see FIG. 4); however, in the case of being mounted on one side of the seat, it is sufficient to provide only one arm formed on the one side according to the positional construction of the seat (see FIG. 5).

Additionally, the bearing portion 2b is not necessarily formed so as to project on the base frame 5 side, and may be formed so as to have a space enough to rotatably mount the upper end portion 15a of the lock lever 15 at the front edge of the lower end portion 2a of the seat back frame 2.

The depth of the guide hole 14 of the arm 13 is suitably designed according to the tilting angle upon the reclining action of the seat back 1, that is, to the movement amount of the bearing portion 2b of the base frame 5, and further, it is formed depending on the magnitude of a damping structure 16 formed in the guide hole 14. Additionally, the guide hole 14 itself is formed such that the inside diameter is increased in the direction of movement of the lower end portion 15b of the lock lever 15 in and out of the guide hole 14. For example, for the lock lever 15 formed of a round bar, the guide hole 14 is formed in an elapse shape, and further, the lock lever 15 itself may be formed of a suitable shape such as a round bar or a square bar.

Figure 6:
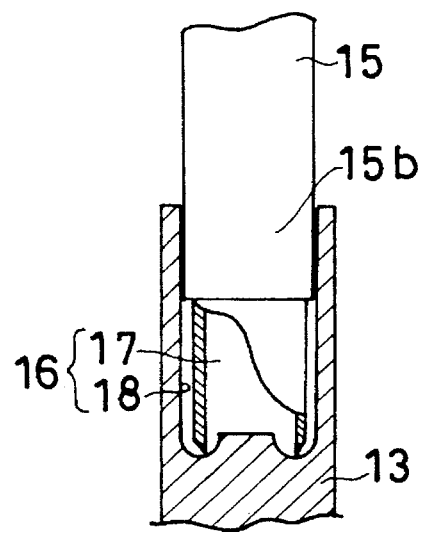
Figure 6:
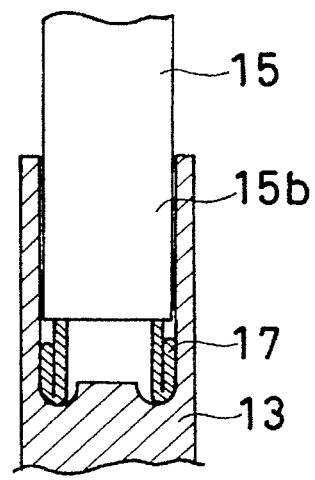

FIG. 6 shows a first embodiment of a damping structure 16. In this embodiment, the guide hole 14 is formed with a deforming guide surface 18. Around the inner surface of the deforming guide surface 18, a deforming cylinder portion 17 formed on the leading edge of the lower end portion 15b of the lock lever 15 is fitted, and when the lock lever 15 is applied with a shock load, the deforming guide surface 18 deforms and buckles the deforming cylinder portion 17. Namely, in the normal usage of the seat, the deforming cylinder portion 17 formed on the lock lever 15 side has a strength enough to support the upper portion of the shaft supporting portion 8 of the seat back frame 2 and to prevent the forward turning of the seat back 1. However, when the seat back 1 is applied with a shock load more than a specified strength, the leading edge of the lower end portion 15b of the lock lever 15 is extended and pushed in the guide hole 14 by the pushing action accompanied with the shock load, so that the deforming cylinder portion 17 is deformed and broken along the deforming guide surface 18 of the guide hole 14. By the extinction of the mechanical energy due to the plastic deformation of the deforming cylinder portion 17, the shock load applied to the seat back 1 is damped and canceled, as a result of which the rapid forward turning of the seat back 1 can be prevented. The deforming direction of the deforming cylinder portion 17 formed on the lock lever 15 side is restricted by the diameter of the deforming cylinder portion 17 and the tilting direction of the deforming guide surface 18 formed within the guide hole 14. The deforming cylinder portion 17 is, of course, deformed and buckled in either outer peripheral or inner peripheral direction, with the same effect. Additionally, the shock absorbing capability of the deforming cylinder portion 17 can be suitably designed by appropriately changing the wall thickness of the deforming cylinder portion 17.

Figure 7:
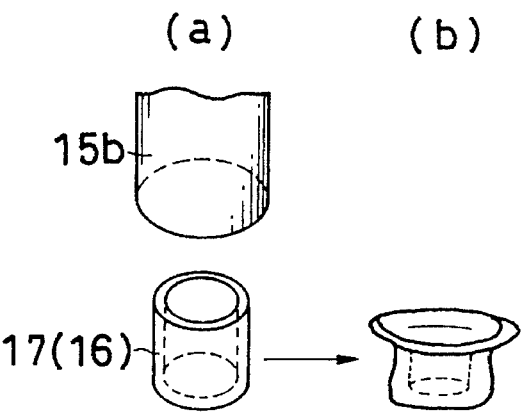
Figure 8:
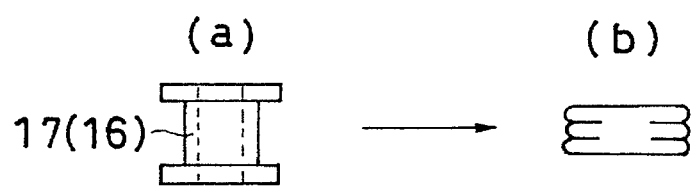
Figure 9:
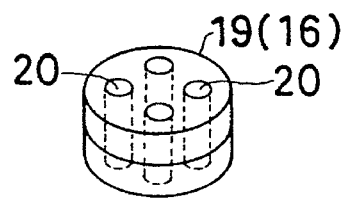
FIG. 9 is a perspective view showing a modification regarding a damping structure according to the present invention.
Figure 10:
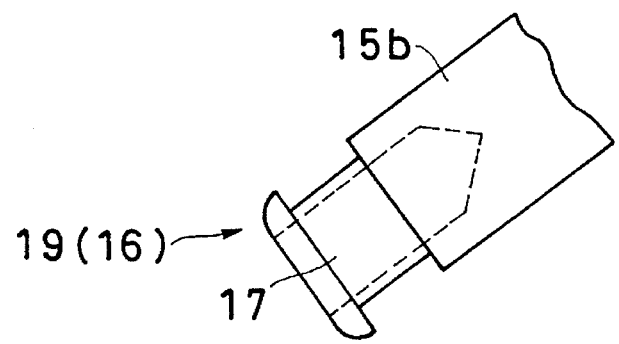
FIG. 10 is related to a fourth embodiment of a damping structure according to the present invention, and which is an enlarged side view of essential parts showing a shock absorbing member interposed at the leading edge of the lower end portion of a lock lever.

FIGS. 7 to 9 show other embodiments regarding the damping structure 16. In embodiment of FIGS. 7(a) and (b) and 8(a) and (b), a shock absorbing member 16 is interposed within a guide hole 14 fitted with a lower end portion 15b of a lock lever 15. The shock absorbing member 16' is made from a material having a relatively small shock absorbing capability for example, an aluminum alloy, a synthetic resin or the like. The shock absorbing member 16' is formed in a cylindrical body (see FIG. 7a) or formed in a cylindrical body with flanges provided on the upper and lower portions (see FIG. 8a), and thus suitably designed according to the seat structure or the magnitude of the shock lead applied to the seat back 1. Similarly to the damping structure 16 according to the first embodiment, the shock absorbing member 16' is deformed by a shock lead applied to the seat back 1 to obtain a specified withstand lead force. In the shock absorbing member 16' formed in a cylindrical body (FIG. 7a), it is deformed from the upper end side of the cylindrical body (FIG. 7b). On the other hand, in the so-called bobbin shaped shock absorbing member 16' formed with flanges on the upper and lower portions (FIG. 8a), the intermediate portion is deformed and buckled (FIG. 8b). Further, in place of the above cylindrical body, there may be formed the so-called lotus root type member 19 in which a plurality of through-holes 20 are perforated in the axial direction as shown in FIG. 9. In such a lotus root type shock absorbing member 19, the withstand lead force can be designed to be changed by the diameter and the number of the through-holes 20. Additionally, the above shock absorbing member 19 may be formed in a one piece with or integrally with the lower end portion 15b of the lock lever 15 as shown in FIG. 10.

Numeral 21 indicates a seat lock, one side of which is connected to a lower end portion 7a of the brake over arm 7, and the other side of which is fixed on the base frame 5 side. The seat lock 21 can be freely extended and contracted, for example, by operation of a reclining button (not shown) formed on the wing 10 side to prevent the turning of the brake over arm 7 with a specified length, to thereby tilt the seat back 1 rearward at a specified angle and fix the tilting angle, and to control the reclining action of the seat back 1. The brake over arm 7 is intended to fold the seat back 1 on the seat bottom 9 when the seat is contained. Accordingly, for the seat in use, the brake over arm 7 is fixed integrally with the lower end of the seat back frame 2 with a specified strength.

Accordingly, in the case that the seat back 1 is operated in the reclining direction thereof, that is, in the contracting direction of the seat lock 21 by the axial sliding action of the lower end portion 15b of the lock lever 15 with respect to the arm 13, the lower end portion 15b of the lock lever 15 is freely slid in the direction of being moved out of the guide hole 14 of the arm 13, and further, when the seat back 1 is applied with a forward load, the lower end portion 15b of the lock lever 15 is fitted in the guide hole 14, and is abutted on the bottom portion of the guide hole 14 through the damping structure 16 formed at the leading edge thereof to support the load, thus preventing the forward tilting of the seat back 1.

Additionally, in this embodiment, there is described the type where in the brake over arm 7 is formed on the lower end portion 2a of the seat back frame 2; however, the lower end portion 2a of the seat back frame 2 may be formed so as to extend up to the portion where the brake over arm 7 is formed, and may be linked with the seat lock 21, and further, the brake over arm 7 itself may be omitted. Further, the damping structure 16 interposed at the leading edge of the lower end portion 15b of the lock lever 15 is not limited to the embodiments, and may be suitably changed in design within the scope of the present invention.

The tilt lock device of locking the forward tilting of the seat back is so constructed as described above, and therefore, even in a passenger seat mounting a shoulder harness, the seat back is prevented from being easily turned forward by a load applied to the shoulder harness; and further, even when the seat back is applied with a shock load more than a specified value, it is possible to damp a shock energy transmitted from the lock levers to each portion of the seat, and hence to prevent the rapid forward turning of the seat back. Accordingly, when the damping structure is additionally provided on the seat back, only the simple parts such as the above-described arms, lock levers and a damping structure are added to the existing seat, without any excessive member for increasing the withstand load property against the shock energy, and without increasing the total weight of the seat itself for reinforcing the strength. As a result, the tilt lock device of the present invention has an extremely excellent effect, for example, in preventing an increase in the cost.

POSSIBILITY OF EXPLOITATION IN INDUSTRY

A shock energy absorbing mechanism in a tilt lock device according to the present invention is applicable for a supporting structure of a vehicular seat having a shoulder harness in various vehicles such as a railway vehicle, automobile and air plane, which is intended to enhance the safety for the vehicular seat.

I claim:

1. A shock energy absorbing mechanism in a tilt lock device, which includes a base frame having a pair of right and left spreaders including front side supporting portions supported substantially in a horizontal direction between front and rear beams, and rear side supporting portions projecting so as to be angled upwardly from a rear portion of the front side supporting portions, wherein lower end portions of a pair of seat back frames are respectively rotatably supported on the rear side supporting portions of the spreaders at a predetermined position, the shock absorbing member comprising:

a bearing portion formed on each of said seat back frames at a location above said predetermined position;

an arm fixed at a rear end of the front side supporting portions of the spreader, said each arm having a guide hole formed in a top face thereof which substantially faces each said bearing portion; and a lock lever having an upper end rotatably secured to each said bearing portion and a lower end portion inserted in the guide hole, wherein the lower end portion of each said lock lever is axially slidable within the guide hole of the associated supporting arm according to the reclining action of the seat back frame.

2. A shock energy absorbing mechanism in a tilt lock device according to claim 1, further comprising a damping means located within each said guide hole for damping shock applied to said seat back frames, said lower end portion of each said lock lever resting on each said damping means.

3. A shock energy absorbing mechanism in a tilt lock device according to claim 2, wherein the damping means includes a deforming guide surface formed around an inner surface of the guide hole, and a deforming cylinder portion provided on each said lock lever which is deformed and buckled along the deforming guide surface when fitted in the guide hole of the arm.

4. A shock energy absorbing mechanism in a tilt lock device according to claim 2, wherein the damping means comprises a shock absorbing member interposed between the interior of the guide hole and the leading edge of the lower end portion of the lock lever fitted in the guide.

5. A tilt locking device for a seat including a back rest frame for supporting a backrest portion of the seat, said back rest frame including a pair of side bars extending downwardly, the tilt locking device comprising:

a base frame including a pair of spreader bars each including a first section extending substantially horizontally and having a front end and a rear end and a second section extending upwardly from said rear end of said first section;

securing means for rotatably securing each said side bar to each said second section of said spreaders at a predetermined position on said side bars, respectively;

locking means for preventing said side bars, and attendantly said back rest frame, from rotating in a forward direction with respect to said base frame; and damping means for damping shock in said locking means when a force is applied to said backrest portion of the seat urging said backrest frame in said forward direction, said damping means being disposed within said locking means.

6. The tilt locking device of claim 5, wherein said locking means comprises:

an arm secured to each said first section of said spreader bars proximate said rear end thereof, each said arm having a hole in a top surface thereof; and a lock lever having a first end rotatably secured to each said side bar at a location above said predetermined position and a second, opposite end received in said hole of each said arm.

7. The tilt locking device of claim 6, wherein said damping means comprises a damping member provided in each said hole, said second end of each said lock lever abutting against each said damping member when said force is applied.

8. The tilting device of claim 7, wherein said damping member comprises a tubular member.

9. The tilting device of claim 8, wherein said tubular member has flanges at opposite ends thereof.

10. The tilting device of claim 8, wherein said damping member comprises a cylindrical member having a plurality of holes extending therethrough in a longitudinal direction.

11. The tilting device of claim 7, wherein said damping member is integral to said second end of said lock lever.

* * * * *